US007028172B2

(12) United States Patent
Levidow et al.

(10) Patent No.: US 7,028,172 B2
(45) Date of Patent: Apr. 11, 2006

(54) METHOD AND SYSTEM FOR OBTAINING COMPUTER SHUTDOWN INFORMATION

(75) Inventors: Björn B. Levidow, Bellevue, WA (US); John D. Service, Monroe, WA (US); Vincent R. Orgovan, Bellevue, WA (US); Wael H. Bahaa-El-Din, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 581 days.

(21) Appl. No.: 10/040,222

(22) Filed: Oct. 29, 2001

(65) Prior Publication Data

US 2003/0084276 A1    May 1, 2003

(51) Int. Cl.
*G06F 15/177* (2006.01)

(52) U.S. Cl. ............................................. 713/1; 714/24

(58) Field of Classification Search .................... 713/1; 714/24, 50, 39; 707/1; 709/220
See application file for complete search history.

(56) References Cited

U.S. PATENT DOCUMENTS

| 6,594,786 B1* | 7/2003 | Connelly et al. ............. 714/50 |
| 6,647,492 B1* | 11/2003 | Nathan et al. ................. 713/1 |
| 6,654,798 B1* | 11/2003 | Skibinski et al. ........... 709/220 |
| 6,754,648 B1* | 6/2004 | Fittges et al. ................. 707/1 |

OTHER PUBLICATIONS

Harvey Brydon, "Powerfail recovery", Dec. 1995, http://groups-beta.google.com/group/vmsnet.internals/browse_thread/thread/fe5ab14cdef5e073/699a6afa01076304?q=%22shutdown+reason%22&rnum=43&hl=en.*
Campbell, John, "The New Utilities of Windows 98," *Windows 98: An Early Look at the Memphis Utilities*, (1997), pp. 1-5, http://www.windowatch.com/john3.html.
Murphy, Brendan, et al., "Measuring System and Software Reliability Using an Automated Data Collection Process" *Quality and Reliability Engineering International*, vol. 11, (1995), pp. 341-353.
"Open VMS System Manager's Manual," Digital Equipment Corporation, (1996), pp. 1-13, http://www.mi.infn.it/~calcolo/Open VMS/ssb71/6015/6017p008.htm.
Posey, Brien M., "Troubleshooting with the Windows 98 system Information Utility," *TechRepublic's Windows Support Professional*, (2000), pp. 1-11, http://www.microsoft.com/technet/maintain/w98sysi1.asp.
U.S. Appl. No. 09/549,814, filed Apr. 14, 2000, Hendel et al.

* cited by examiner

*Primary Examiner*—Chun Cao
(74) *Attorney, Agent, or Firm*—Marshall, Gerstein & Borun LLP

(57) ABSTRACT

A method and a system for obtaining shutdown information for a computer allows a user to indicate a reason or reasons for the shutdown. The states of the user mode processes that are running on the computer are saved for later analysis. The state information as well as the shutdown reason entered by the user is stored in a computer-readable memory, such as in the form of a log file. A user may report a shutdown reason by selecting a reason from a predefined reason list and/or by typing a reason in a comment area.

33 Claims, 13 Drawing Sheets

METHOD AND SYSTEM FOR OBTAINING COMPUTER SHUTDOWN INFORMATION

TECHNICAL FIELD

This invention relates to collecting performance information about computer programs, and, more particularly, to obtaining information as to the reasons that a computer is being or has been shut down.

BACKGROUND

Programs that crash or lock-up can result in substantial down time for machines and users alike. It is, therefore, important to be able diagnose such programs to find out why they are having problems. Having a comprehensive history of the problems greatly aids in the detective work. However, it is not always easy to accumulate an accurate history of crashes or lock-ups. In a corporate network, for example, an administrator may install an error-prone program on many clients throughout a network. If the problem with the program is the kind that prevents users from using the program at all, then the users will usually inform the system administrator immediately, making it easy to build up a history. The problem may not be so catastrophic, however. For example, if the program has intermittent problems that the users can solve simply by shutting it down and restarting it, then the system administrator may seldom, if ever, receive feedback from the users. As a result, the down time resulting from the program may go undetected.

Thus, it can be seen that there is a need for a new method and system for obtaining computer shutdown information.

SUMMARY OF THE INVENTION

The present invention provides a method and a system for obtaining information about the shutdown of a computer. According to the invention, when a user shuts down a computer he or she (hereinafter "he") enters the reason for the shutdown. The state of the user mode processes running on the computer is stored in memory along with the reason for the shutdown. In one implementation, the user is presented with predefined reasons for the shutdown, and prompted to select one or more of the predefined reasons. The predefined reasons may be stored as entries in an operating system database and may be user-defined. The user may enter the shutdown reason or reasons before, during or after the shutdown of the computer. The reason or reasons may also be entered as the computer is being restarted after the shutdown. Each predefined reason entry stored in the system database may indicate whether the reason is to be displayed during a shutdown of the program, or during a restart of the program following a shutdown. The invention may be implemented to collect information as to why a computer or computer operating system is being shut down by users.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

The invention is generally directed to a method and a system for obtaining shutdown information for a computer, in which a user is prompted to indicate a reason or reasons for the shutdown. The states of the user mode processes that are running on the computer are saved for later analysis. The state information as well as the shutdown reason entered by the user is stored in a computer-readable memory, such as in the form of a text log file or a mark-up language document. A user may report a shutdown reason by selecting a reason from a predefined reason list and/or by typing a reason in a comment area.

In one embodiment, the invention is used to obtain shutdown information for an operating system.

In another embodiment of the invention, a user sends a shutdown command and a shutdown reason from a first computer via network link to a second computer to shut down the second computer. The shutdown reason is then be stored on the second computer for later analysis.

Although it is not required, the invention may be implemented by computer-executable instructions, such as program modules, that are executed by a computer. Generally, program modules include routines, objects, components, data structures and the like that perform particular tasks or implement particular abstract data types. The term "program" as used herein includes one or more program modules. The invention may be implemented on a variety of types of computers, including personal computers (PCs), hand-held devices, multi-processor systems, microprocessor-based on programmable consumer electronics, network PCs, minicomputers, mainframe computers and the like. The invention may also be employed in distributed computing environments, where tasks are performed by remote processing devices that are linked through a communications network. In a distributed computing environment, modules may be located in both local and remote memory storage devices.

Figure 1:
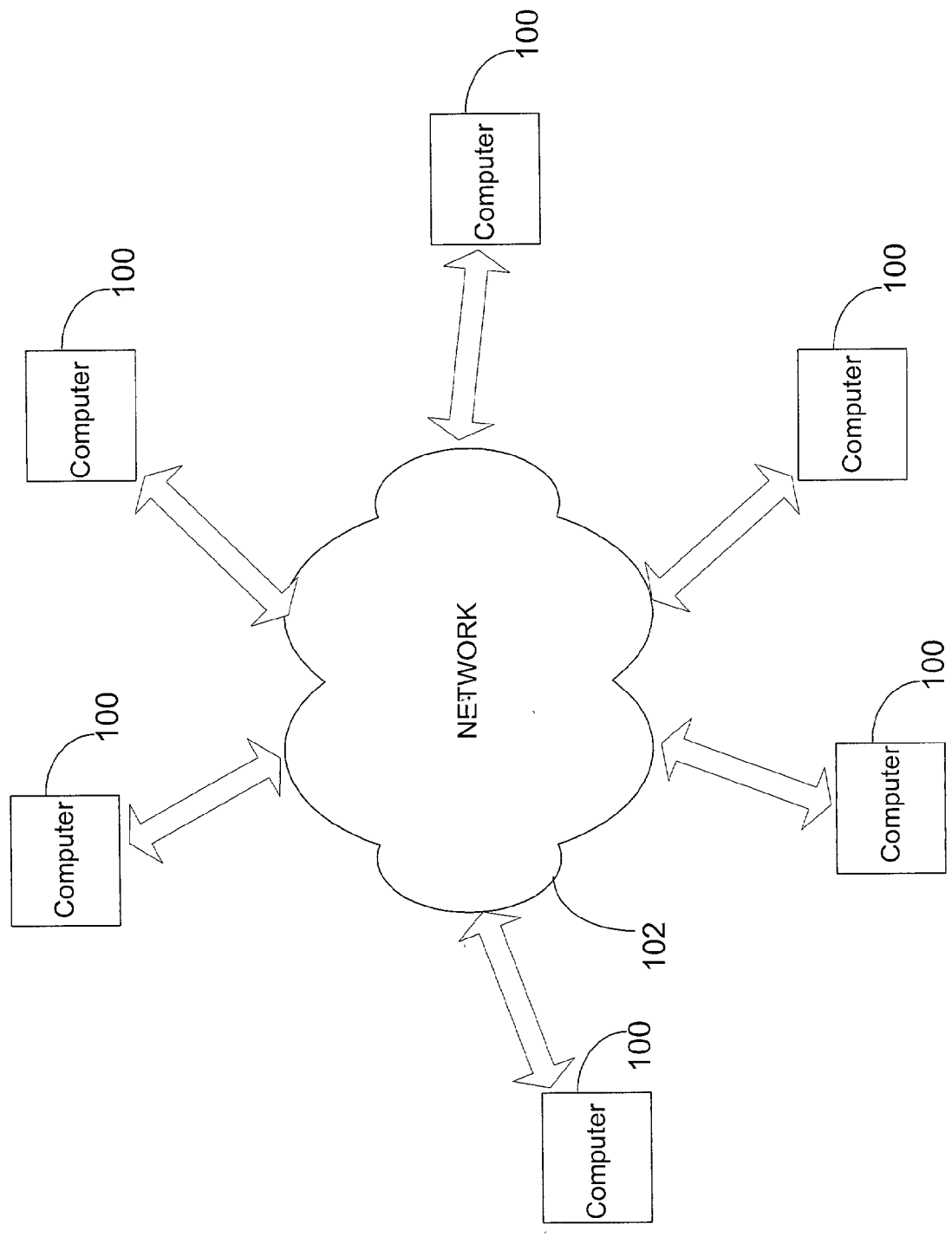
FIG. 1 is an example of a computer network.

An example of a networked environment in which this system may be used will now be described with reference to FIG. 1. The example network includes several computers 100 communicating with one another over a network 102, represented by a cloud. Network 102 may include many well-known components, such as routers, gateways, hubs, etc. and may allow the computers 100 to communicate via wired and/or wireless media.

Figure 2:
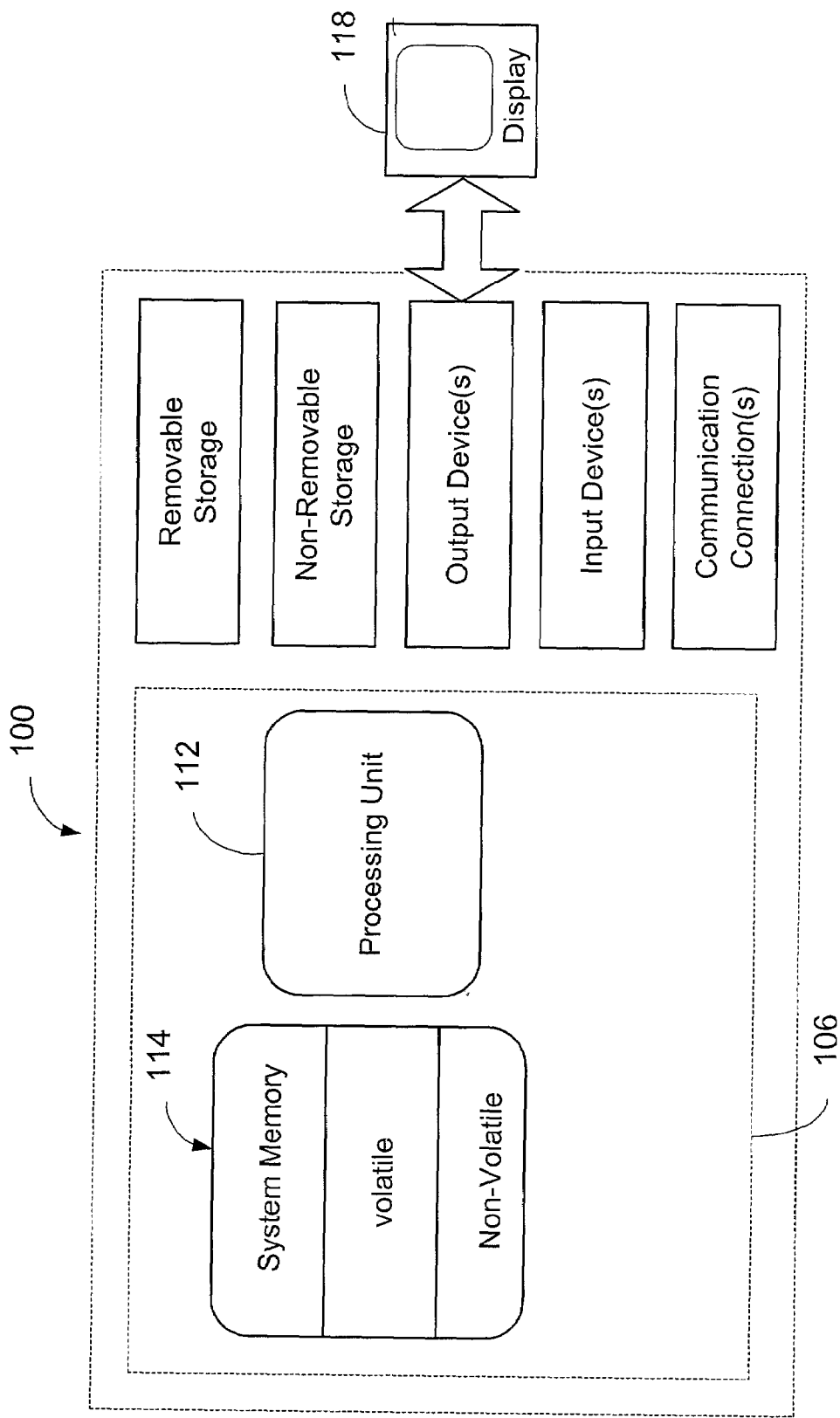
FIG. 2 is an example of a computer.

Referring to FIG. 2, an example of a basic configuration for a computer on which the system described herein may be implemented is shown. In its most basic configuration, the computer 100 typically includes at least one processing unit 112 and memory 114. Depending on the exact configuration and type of the computer 100, the memory 114 may be volatile (such as RAM), non-volatile (such as ROM or flash memory) or some combination of the two. This most basic configuration is illustrated in FIG. 2 by dashed line 106. Additionally, the computer may also have additional features/functionality. For example, computer 100 may also include additional storage (removable and/or non-removable) including, but not limited to, magnetic or optical disks or tape. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 100. Any such computer storage media may be part of computer 100.

Computer 100 may also contain communications connections that allow the device to communicate with other devices. A communication connection is an example of a communication medium. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. The term computer readable media as used herein includes both storage media and communication media.

Computer 100 may also have input devices such as a keyboard, mouse, pen, voice input device, touch input device, etc. Output devices such as a display 118, speakers, a printer, etc. may also be included. All these devices are well known in the art and need not be discussed at length here.

It is known that users shut down computers for a variety of reasons. Some reasons are normal and only reflect network availability. An example of such a reason is when a user shuts down a server for normal maintenance. Some shutdown reasons, on the other hand, may reflect system reliability. For example, a computer user may have to shutdown and reboot a computer after installing a certain program. A user may also have to shutdown and reboot a computer when it is not responding. The present invention is known to be useful for helping system administrators distinguish between these two categories of shutdown reasons. This helps system administrators conduct root-cause analyses, and improve the reliability and stability of their computer networks. The invention is not limited to this use, however.

Figure 3:
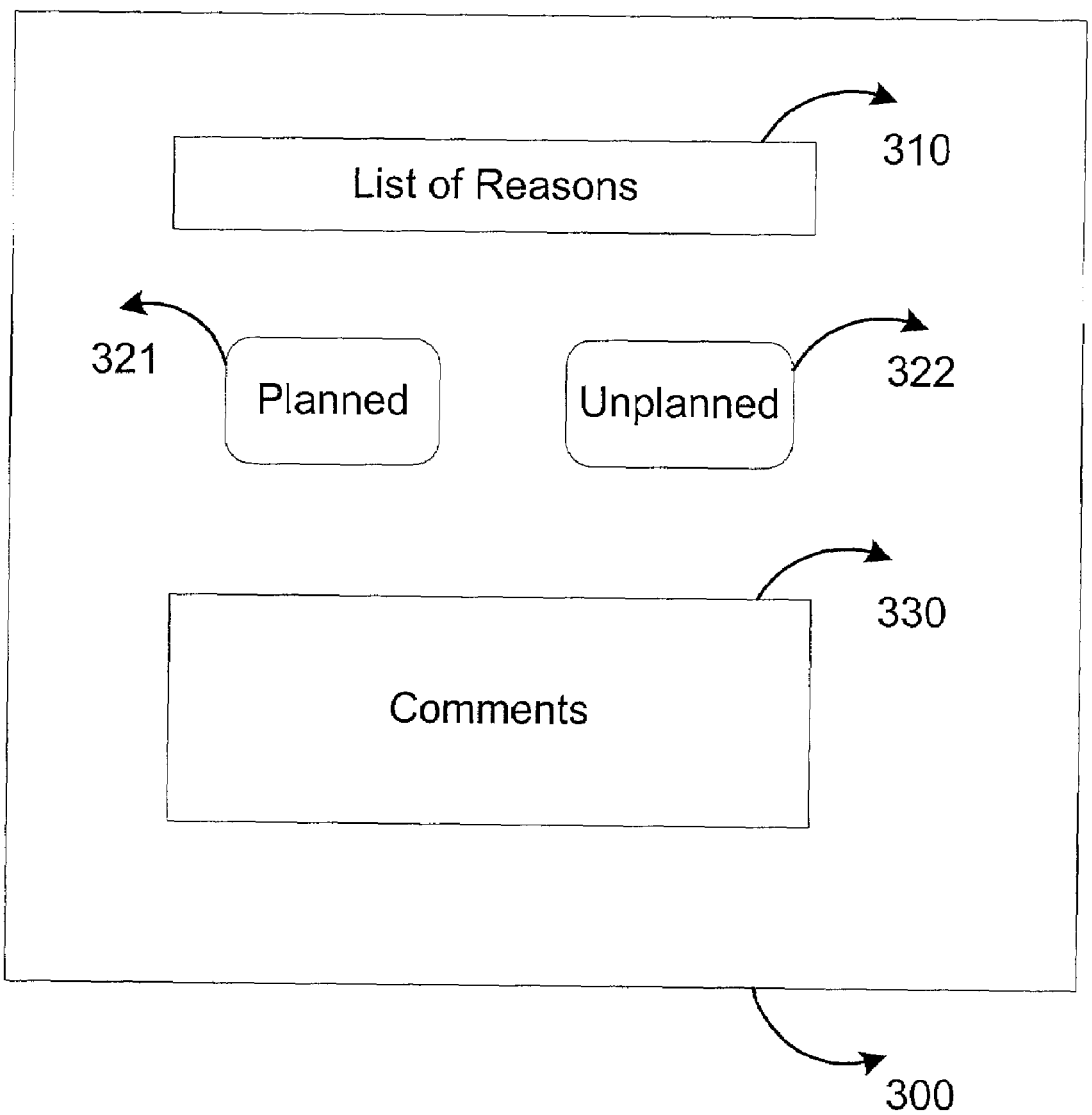
FIGS. 3–5 illustrate examples of user interfaces that may be used in various embodiments of the invention.

There are many possible ways in which shutdown information may be obtained in accordance with the invention. According to one embodiment, the user is shown a dialog box in which he may make selections and/or enter text. Referring to FIG. 3, for example, a user interface (UI) 300 is illustrated. In responding to a computer shutdown initiated by the user, the UI 300 may be displayed to collect the shutdown information. The UI 300 includes a list 310 of possible shutdown reasons, "planned" and "unplanned" selection fields 321 and 322, and a comment box 330. The user may select a reason from the list 310 that best describes why he is shutting down or restarting the computer. The list 310 includes reasons that are appropriate to the circumstances. For example, if the operating system is being shut down, the reasons in the list 310 may include software installation, hardware maintenance etc. To distinguish an expected operation, such as a shutdown for regular maintenance, from an unexpected operation, such as a shutdown for software installation, the user may select the planned or unplanned selection field 321 or the 322. Additional shutdown information may be entered in a comment box 330 by the user. Once the user has entered shutdown information through the list 310, the selection fields 321 and 322, and/or the box 330, the information may be stored for later analysis.

Figure 4:
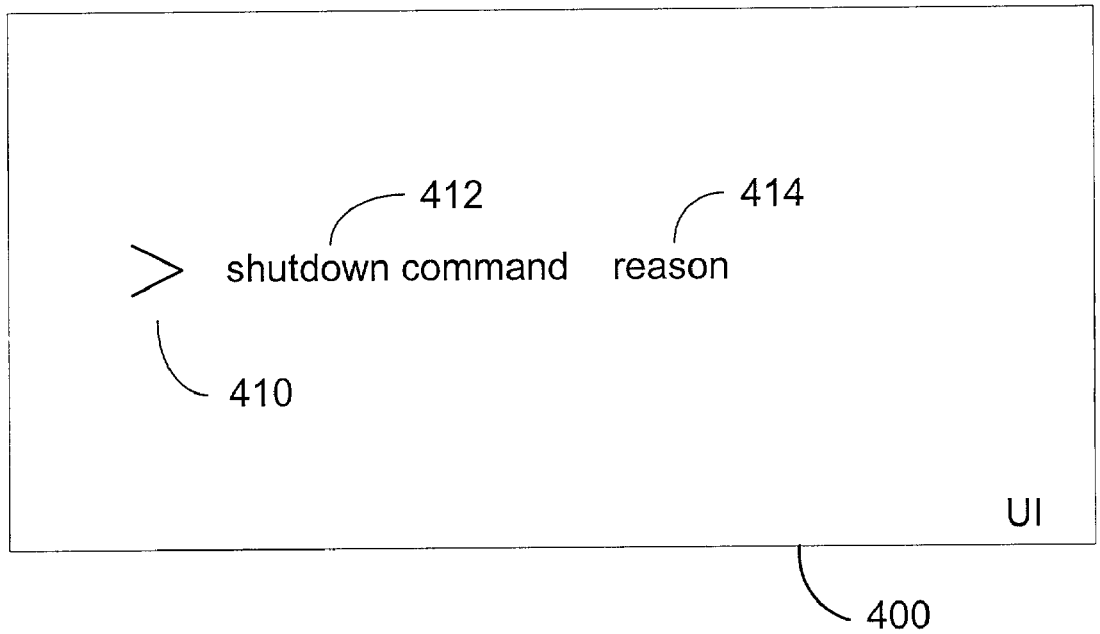

Referring to FIG. 4, another example of how the shutdown information may be obtained from the user is shown. In this example, a UI 400 includes a command line 410. The command line 410 has a first field 412 and a second field 414. To shutdown a program, the user may enter a shutdown command in the first field 412 and a reason for the shutdown in the second field 414. The reason may be expressed in a variety of ways, such as a textual description or a reason code.

A user may be given the opportunity to enter shutdown information before, during or after a computer shutdown, depending on how the invention is implemented. According to one embodiment, as soon as a user indicates a desire to shut the computer down, a UI is presented. In another embodiment the user is presented with a UI upon restarting the computer. The latter embodiment may advantageously be used in situations where the shutdown of the computer came unexpectedly. For example, if the operating system is being shut down, and the computer on which the operating system runs experiences a power failure, then there may not be time for the user to be prompted for shutdown information prior to the shutdown of the operating system. In such a case, the UI may be presented when the user reboots the computer.

Figure 5:
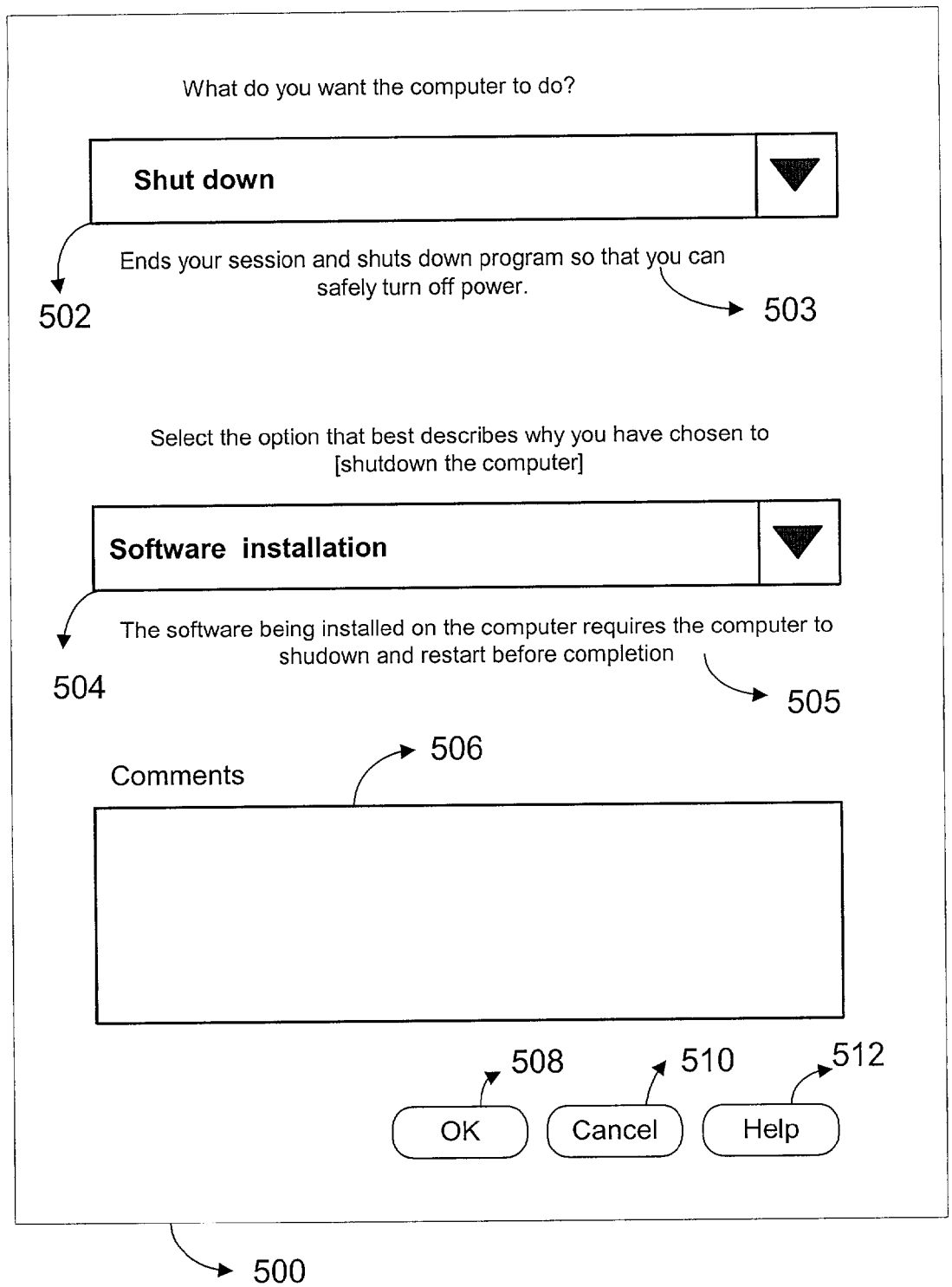

Referring to FIG. 5, another example of a UI may be used in an embodiment of the invention is shown. The UI, generally labeled 500, includes a first pull down menu 502 and a first explanation field 503, a second pull down menu 504 and a second explanation field 505, and a text input area 506. The UI 500 further includes an OK button 508, a cancel button 510, and a help button 512. The first pull down menu 502 allows the user to choose an action to perform, such as shutting down the computer. Other possible actions listed in the pull down menu 502 include logging off a network, or restarting the computer. The first explanation field 503 gives the user a textual explanation of the menu item. The second pull down menu 504 allows the user choose a reason for performing the action chosen in the first pull down menu 502. For example, if the action chosen in the first pull down menu 502 is "shut down," then the choice given to the user in the second pull down menu 504 may include, for example, hardware maintenance, operating system configuration, software installation system failure, power failure and system hung. The second explanation field 505 gives the user a textual explanation of the chosen menu item. The text input area 506 allows the user to enter additional comments such as "power failure was building-wide."

According to an aspect of the invention, a "snapshot" is taken of the states of the computer's user-mode processes just prior to shutdown. The snapshot is then saved in non-volatile memory for later analysis. In one embodiment, the shutdown reason entered by the user determines whether or not a user-mode snapshot is taken. For example, if the user indicates that the shutdown was planned, then there may not need to be a snapshot taken, since a planned shutdown does not generally indicate an anomalous condition. If, however, the user indicates that the shutdown was unplanned—due to a system crash, for example—then the snapshot is taken and stored on the computer's hard drive or other non-volatile memory.

Figure 13:
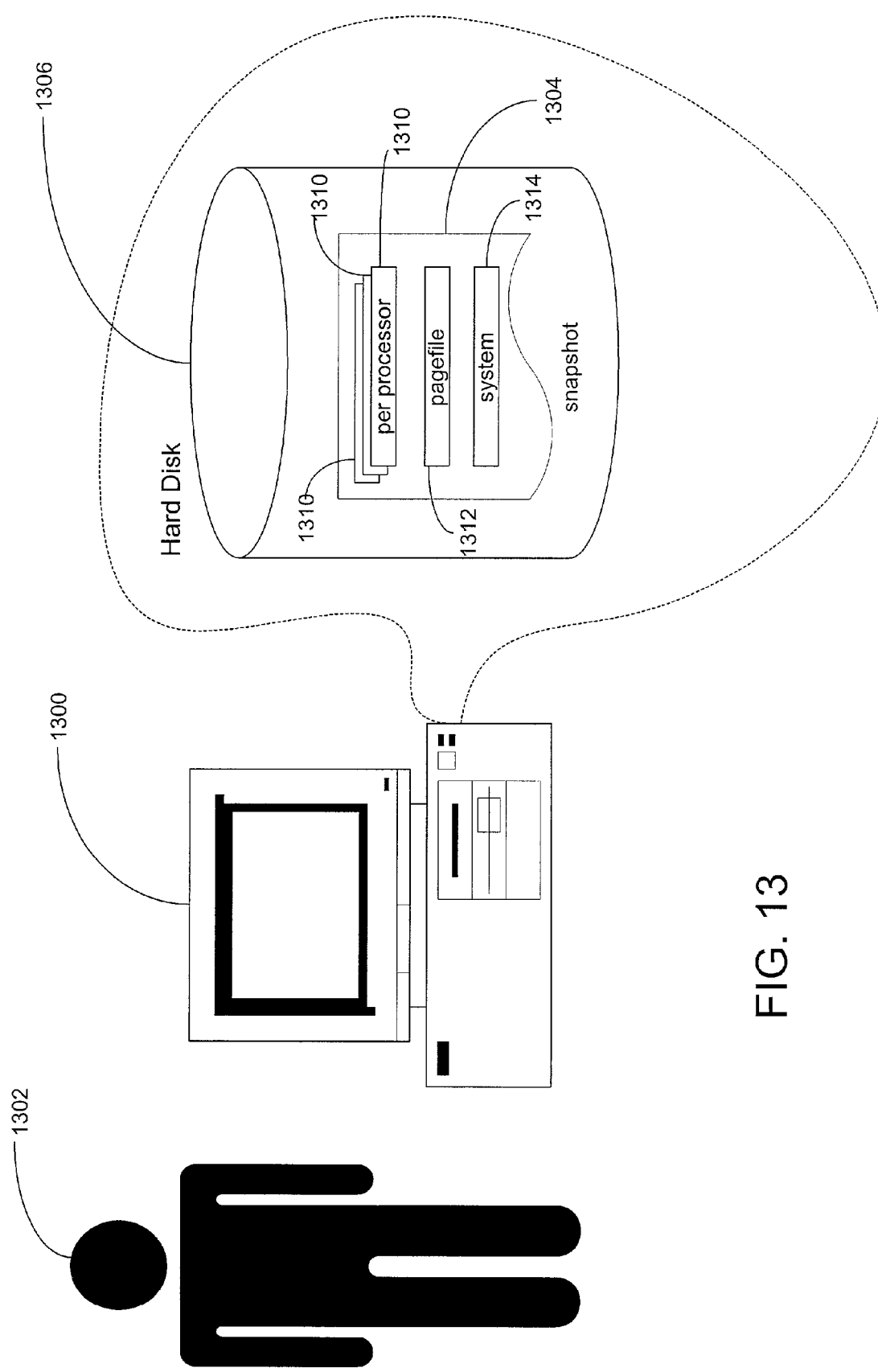
FIG. 13 illustrates an example of a snapshot of user-mode processes may be structured according to an embodiment of the invention.

There are a variety of ways in which a user-mode snapshot may be implemented. Referring to FIG. 13, one example of a user-mode snapshot will now be illustrated and described. In this example, a computer 1300 has just experienced an unexpected shutdown, as indicated by the shutdown reason entered by a user 1302. Prior to shutting down, the computer 1300 takes a snapshot 1304 of its user-mode processes and stores it on its internal hard disk 1306. The snapshot 1304 is an extensible mark-up language (XML) file that includes per process parameters 1310 for each user-mode process, pagefile parameters 1312, and system parameters 1314. The per process parameters 1310 describe those conditions that are relevant to a single process, and may include one or more of the following pieces of information:

User time: The amount of time in seconds that the process kept the processor in user mode.
Kernel time: The amount of time in seconds that the process kept the processor in kernel mode.
Working set: The amount of memory the process was using at the time the snapshot was taken.
Total page faults: The number of times the processor was forced to go to virtual memory on the computer's hard drive.
Bytes committed: The number of bytes of memory the process had reserved at the time of the snapshot, regardless of whether all of it was actually used.
Process priority: The priority of the process vis-à-vis the rest of the processes.
Number of handles: The number of handles, or pointers to blocks of memory being used by the process.
Number of threads: The number of threads that were defined within the process at the time the snapshot was taken.

The pagefile parameters 1312 describe the current state of the pagefile for the computer at the time of the shutdown. The term "page file" refers to the collective blocks of memory on the hard disk that have been allocated for use as virtual memory. The pagefile parameters may include one or more of the following pieces of information:

Current size in Kbytes: The size of the pagefile at the time of the snapshot.
Total used in Kbytes: The total amount of the pagefile that was actually being used at the time of the snapshot.
Peak used in Kbytes: The peak amount of the pagefile that was actually used up to the time of the snapshot.

The system parameters 1314 describe the computer 1300 itself and the resources it is using at the time of the snapshot. The system parameters 1314 may include one or more of the following pieces of data:

System Uptime: The amount of time the computer has been up and running since the last shutdown.
Bios version number: The version number of the basic input output system (BIOS).
System Manufacturer: The name of the manufacturer.
Machine Type/Model: Machine type and model.
Total system memory in Kbytes: The total system memory for the computer.
Available system memory in Kbytes: The amount of system memory that was available to user-mode processes at the time of the snapshot.
Total working set in Kbytes: The amount of the computer's memory that was being used at the time of the snapshot.
In RAM kernel: The amount of the kernel that was in the computer's read-only memory (RAM) at the time of the snapshot.
Paged kernel: The amount of the kernel that is in paged virtual memory on the hard disk at the time of the snapshot.
Committed: The total number of bytes of memory that were committed to user-mode processes at the time of the snapshot.
Limit: The limit on the number of bytes of memory that can be committed to user-mode processes.
Peak: The peak amount of memory that had been committed to user-mode processes at the time of the shutdown.
Paged pool: The amount of memory that has been designated as "paged," meaning that it may be stored on the hard disk as part of the virtual memory system.
Non-paged pool: The amount of memory that has been designated as "non-paged," meaning that it can only exist in RAM.

Figure 6:
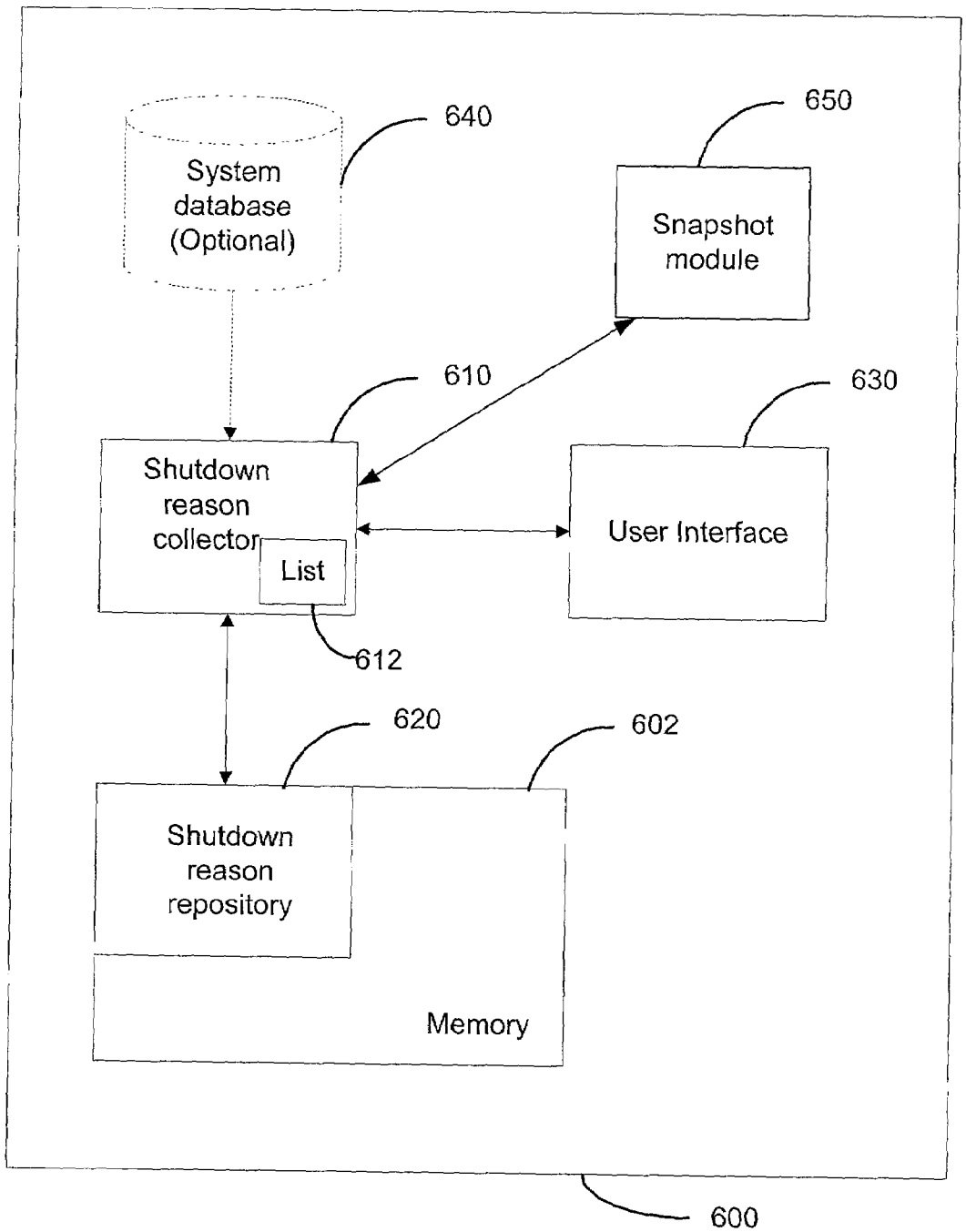
FIG. 6 illustrates an example architecture of an embodiment of the invention.

The present invention may be implemented on computer hardware, computer software, or any combination thereof. There are also a variety of architectures that may be used for the invention. Referring to FIG. 6, an example of an architecture that may be used in an embodiment of the invention will now be described. The architecture includes a computer system 600 having a memory 602, a shutdown reason collector module 610, a user interface 630, a snapshot module 650 for taking a snapshot of the state of the user-mode processes, and an optional system database 640. The collector module 610 includes a list 612 of predefined reasons that a program may be shut down. The memory 602 includes a repository 620 of previously collected shutdown reasons. In some implementations, the system database 640 of the computer system 600 is used to store additional predefined shutdown reasons that the user or system administrator can modify or customize. The shutdown reasons may be presented to a user on an interactive UI, such as the UI 300 of FIG. 3 or the UI 500 of FIG. 5. If the UI 630 is implemented as a command line interface, such as the UI 400 of FIG. 4, the collection module 610 uses the list 612 to verify that the reason or reason code entered by the user is recognizable. Once the user enters the reason for shutting down the computer, the reason is stored in the repository 620, which may be a log file or the like. Furthermore, if the collector module 610 determines the shutdown to be "unplanned," it invokes the snapshot module 650, which takes a snapshot of the current state of the user-mode processes and saves the snapshot on the computer's non-volatile memory. The collector module 610 may prompt the user to enter a reason for shutting down the program prior to, during, or after the program has been shutdown. This allows the total number of recognized shutdown reasons to be extended.

In one implementation, the architecture of FIG. 6 is used in conjunction with the MICROSOFT WINDOWS XP brand operating system to collect information as to why the operating system, and, more generally, the computer system is being shut down. In this implementation, the system database 640 is the SYSTEM REGISTRY and the repository 620 is the SYSTEM LOG. The shutdown reasons are compiled into the WINDOWS XP code and stored as keys in the SYSTEM REGISTRY. The shutdown reasons are divided into major and minor reason groups. These keys may be modified by a user having sufficient access privileges (such as an administrator) in a well-known manner, or through an administrative interface (not shown) provided as an external tool. Once the collector module 610 obtains shutdown reasons from a user, it calls the ExitWindowsEx application programming interface (API). Invoking the ExitWindowsEx API calls a log file helper function to log the reasons into the SYSTEM LOG.

Figure 7:
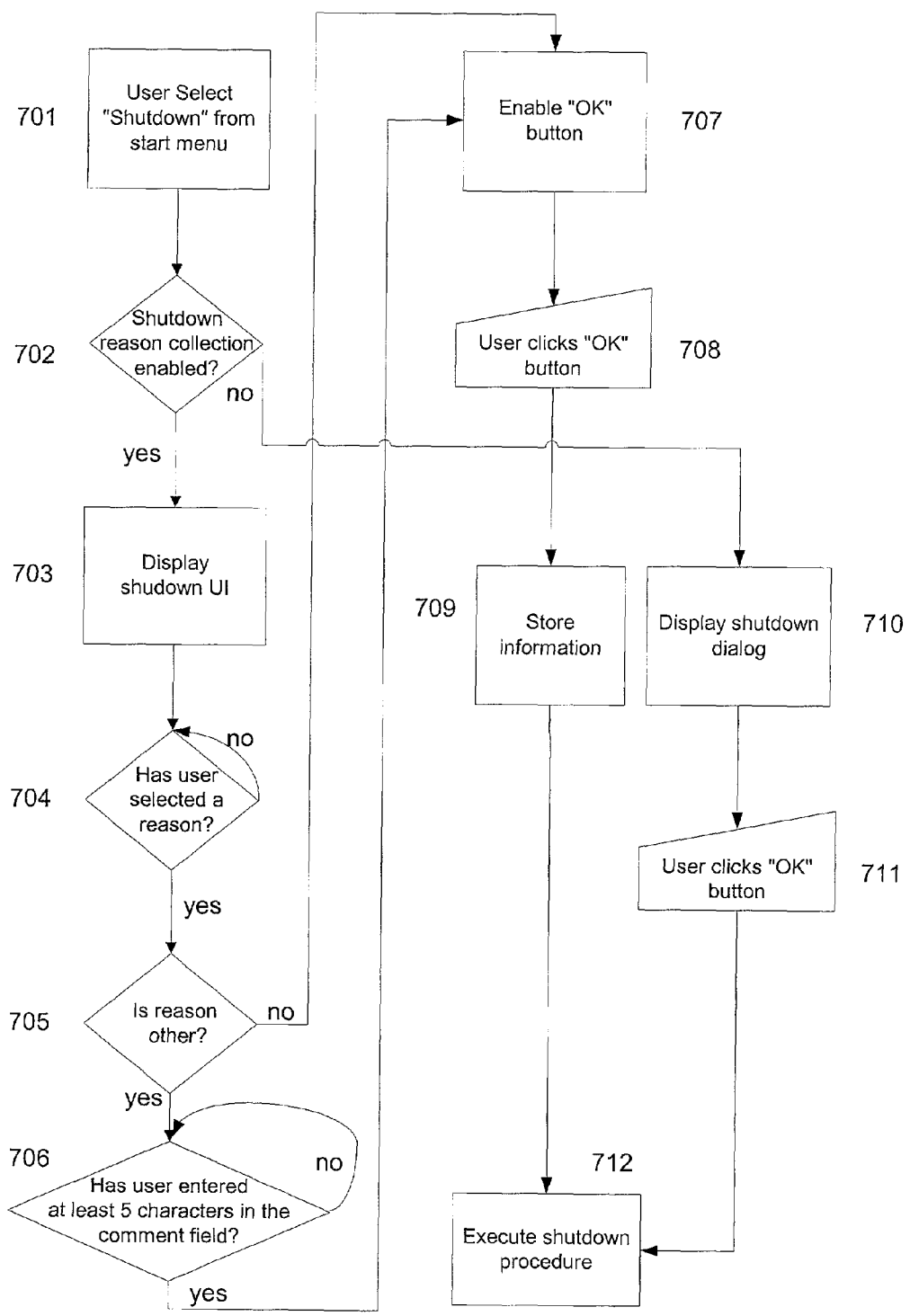
FIGS. 7 and 8 illustrate the functionality of an embodiment of the invention.
Figure 8:
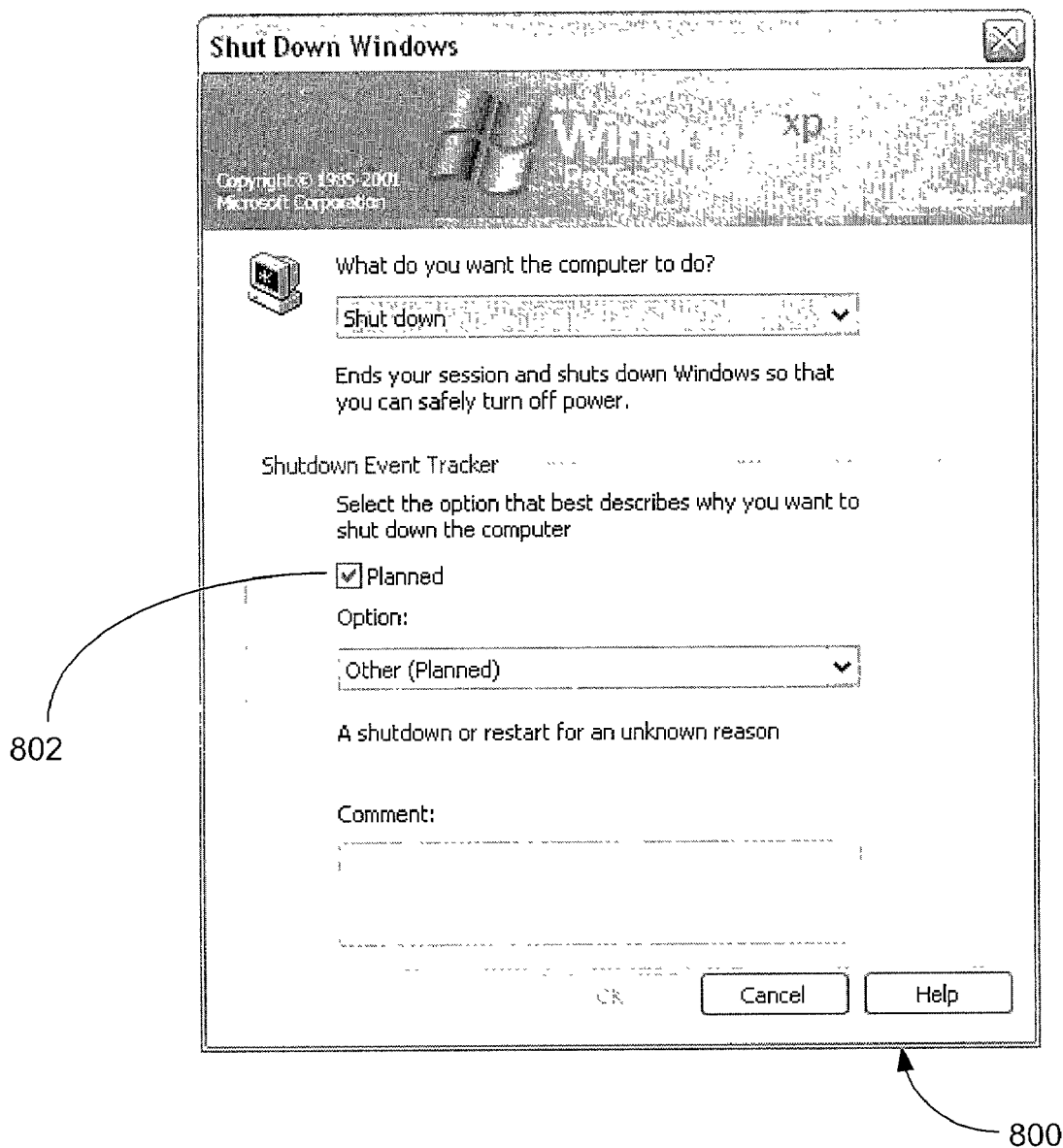

Referring to FIGS. 7 and 8, an example of the steps taken to collect shutdown information for a computer running the WINDOWS XP operating system will now be described. It is understood that these steps are applicable to non-WINDOWS XP implementations as well, even though described in the context of WINDOWS XP. At step 701, the user selects "Shutdown" from the WINDOWS XP "Start" menu. At step 702, the collector checks the system database 640 to determine whether shutdown reason collection has been enabled. If it has not been enabled, then the flow proceeds to steps 710 and 711, at which a conventional shutdown dialog box is activated and manipulated by the user. If shutdown reason collection has been enabled, then the collector module 610 (FIG. 6) retrieves the list 612 of shutdown reasons, and retrieves any custom-defined shutdown reasons from the system database 640, and displays the reasons on a UI 800 (FIG. 8) at step 703. As shown in FIG. 8, the UI 800 includes a check box 802 to allow the user to indicate that the shutdown is unplanned. At steps 704–706, the collector module 610 waits for the user to either select a predefined shutdown reason from the pull-down menu, and enter his own reason (five characters minimum) in the comments box. After one of those actions has been taken, the collector module 610 enables the OK button (step 707). After the user clicks OK (step 708), then the collector module 610 stores the entered reason in the reason repository 620 via the ExitWindowsEx API and log file helper function (step 709). At step 712, the WINDOWS XP operating system shuts down.

Figure 9:
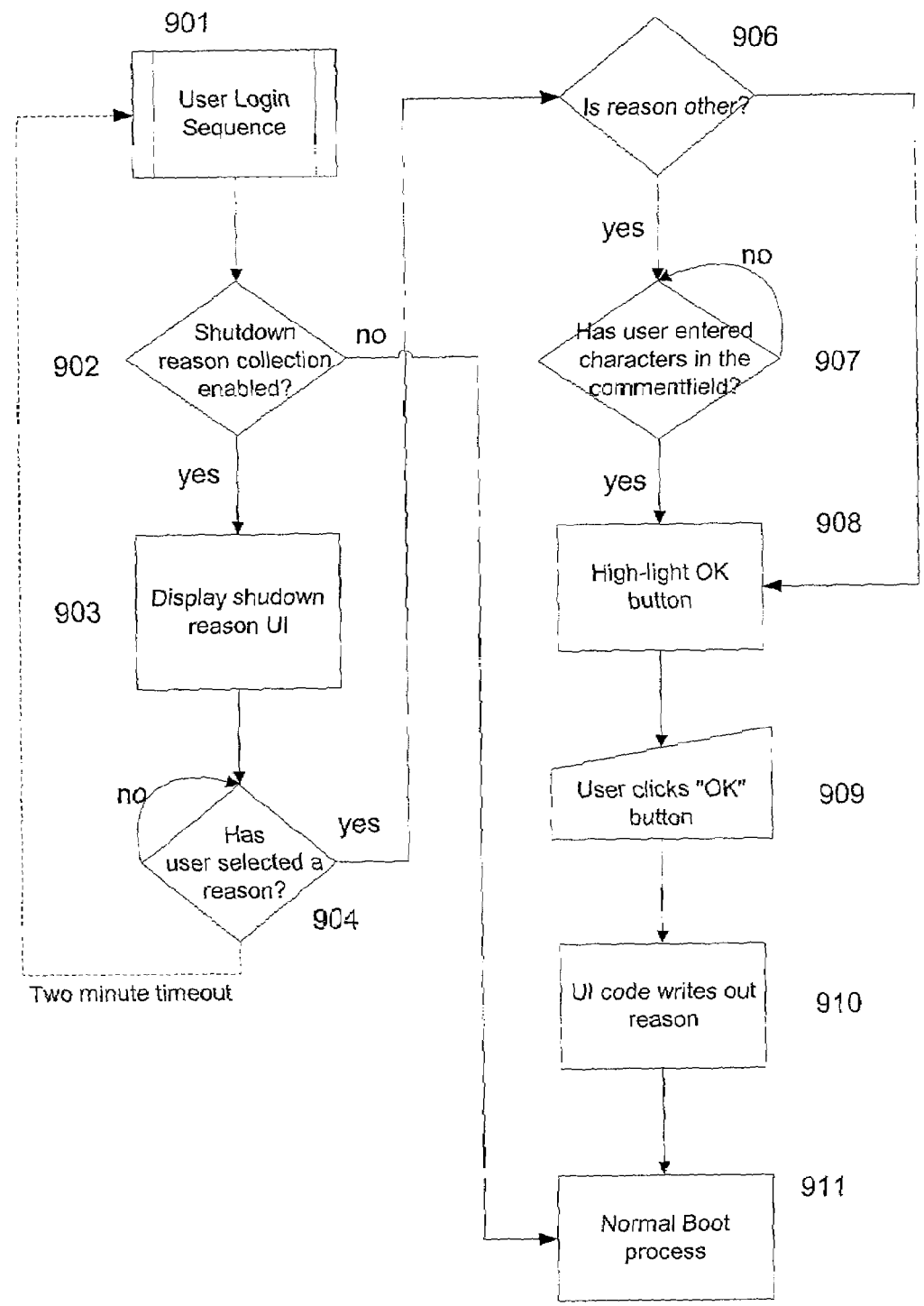
FIGS. 9 and 10 illustrate the functionality of another embodiment of the invention.
Figure 10:
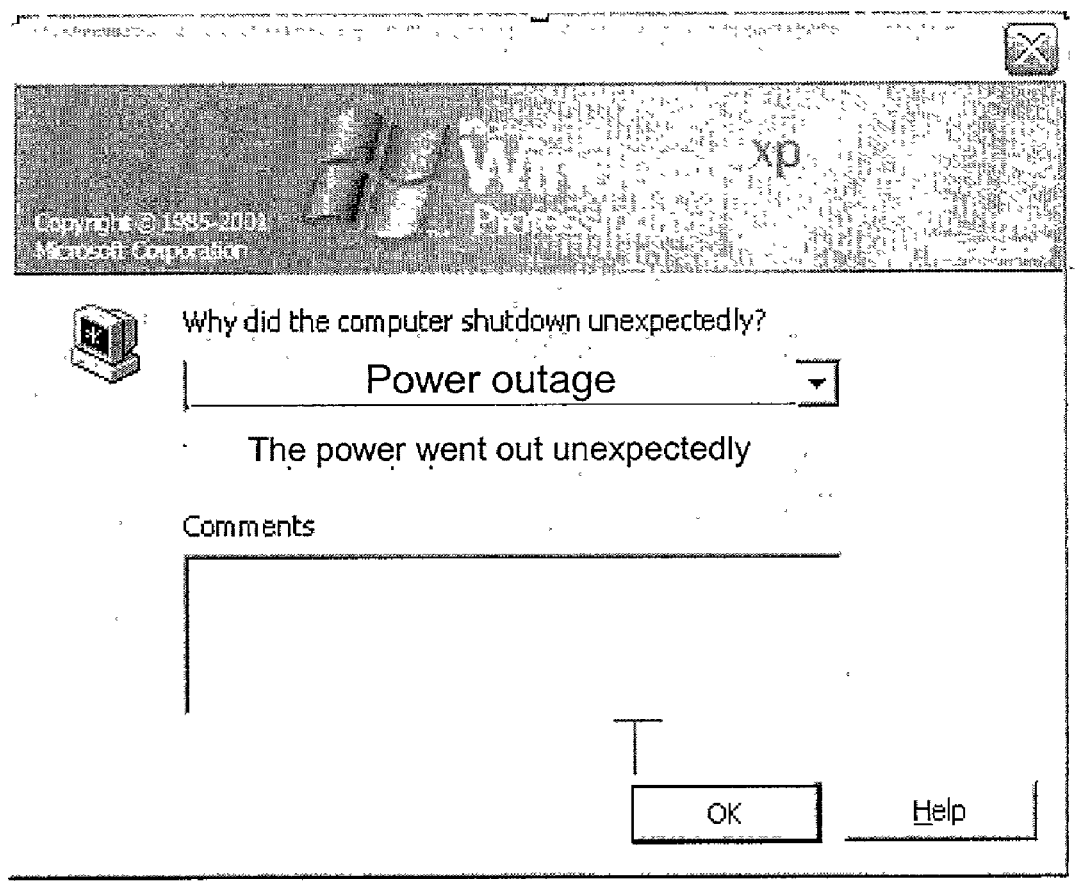

Referring to FIGS. 9 and 10, another example of steps that may be taken to collect shutdown information for a computer running the WINDOWS XP brand operating system will now be described. It is assumed that this procedure occurs during a reboot operation following an unexpected shutdown of the operating system. It is understood that these steps are applicable to non-WINDOWS XP implementations as well, even though described in the context of WINDOWS XP. At step 901 (FIG. 9), the user logs in. At step 902, the collector module 610 (FIG. 6) checks the system database 640 to determine whether shutdown reason collection has been enabled. If it has not been enabled, then the flow proceeds to step 911, at which a conventional reboot ensues. If shutdown reason collection has been enabled, then the collector module 610 retrieves the list 612 of shutdown reasons, and retrieves any custom-defined shutdown reasons from the system database 640, and displays the reasons on a UI 1000 (FIG. 10) at step 903. At steps 904, 906 and 907, the system manager module 610 waits for the user to either select a predefined shutdown reason from the pull-down menu, or enter his own reason in the comments box. Optionally, the user may be sent back to step 901 after a two minute time-out. After the user selects or enters a reason, the collector module 610 enables the OK button (step 908). After the user clicks OK (step 909), then the collector module 610 calls the log file helper function directly and stores the entered reason in the repository 620 (step 910). At step 911, the WINDOWS XP operating system resumes its normal booting operation.

Figure 11:
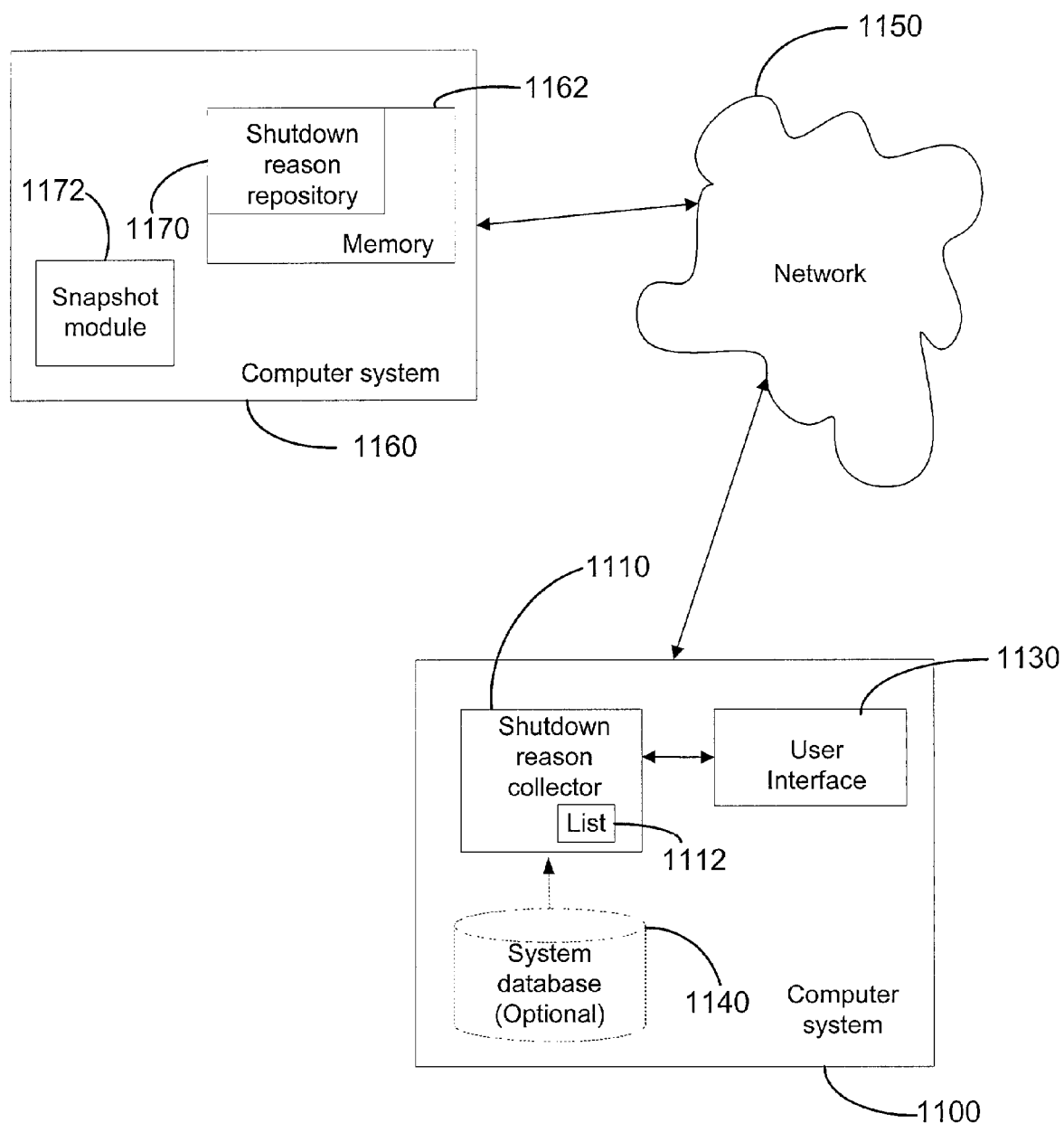
FIG. 11 illustrates yet another example architecture of an embodiment of the invention.

Referring to FIG. 11, yet another example of an architecture that may be used in an embodiment of the invention is shown. The architecture comprises a first computer system 1100 that includes a shutdown reason collector module 1110 having a list 1112 of predefined shutdown reasons, a user interface 1130, and an optional system database 1140. The architecture further comprises a computer network 1150, and a second computer system 1160 having a memory 1162, and a snapshot module 1172. The memory 1162 further includes a shutdown reason repository 1170, which may be a lag file. The first and second computer systems may communicate with one another over the network 1150. The system database 1140 may include predefined shutdown reasons in addition to those in the list 1112 of the collector module. A user at the first computer system 1100 may remotely shut down a program on the second computer system 1160 via the user interface 1130. The user interface 1130 also gives the user an opportunity to enter a reason for the shutdown. The collector module 1110 checks the list 1112, as well as the system database 1140 to ensure that the entered reason is recognizable. It based on the entered reason, the collector module 1110 determines the shutdown to be unplanned, then the collector module 1110 invokes the snapshot module 1172, which takes a snapshot of the state of the user-mode processes and saves the snapshot on the non-volatile memory of the computer system 1160. The collector module 1110 then stores the shutdown reason remotely in the log file 1112. Storing the shutdown reason on the second computer system 1160 is advantageous, since it is a program on the second computer system that is being shutdown, even though the action was initiated from the first computer system.

Figure 12:
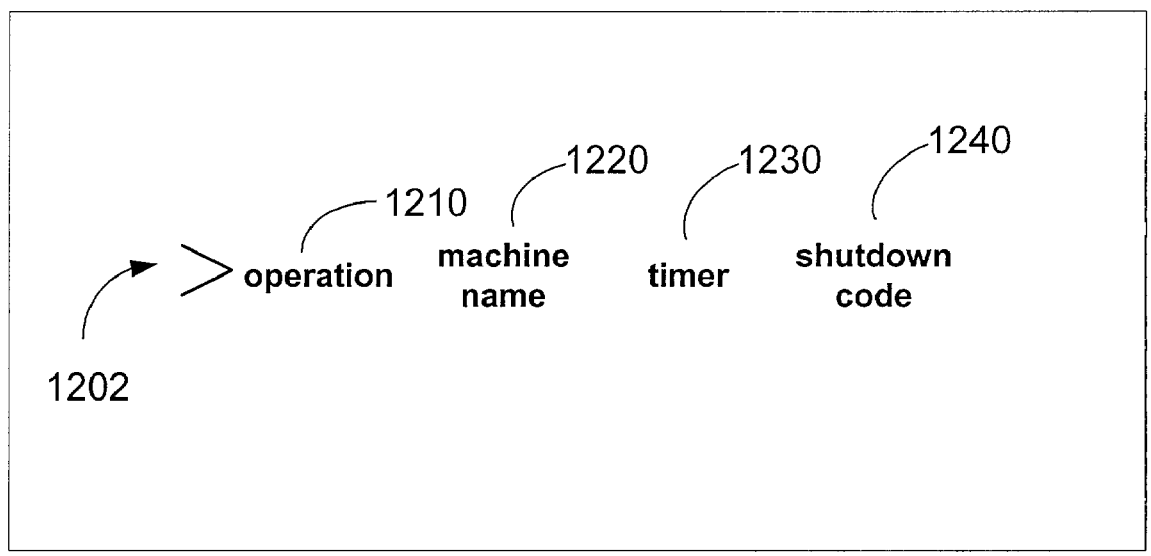
FIG. 12 illustrates an example of a command line interface that may be used in an embodiment of the invention.

Referring to FIG. 12, an example of how the architecture of FIG. 11 may be implemented to collect shutdown information of computer running the WINDOWS XP brand operating system will now be described. It is assumed for this example that the second computer system 1160 is running the WINDOWS XP brand operating system. FIG. 12 illustrates a command line interface that may be used as the user interface 1130 of FIG. 11. The command line interface includes a command line 1202. The command line 1202 includes an operation field 1210, a machine name field 1220, a timer setting field 1230, and a shutdown code field 1240. When the user wishes to shut down the second computer system 1160, he types in "shutdown" in the operation filed 1210, the name of the computer system 1160 in the machine name field 1220, the time that is to elapse prior to shutdown in the timer field 1230, and the shutdown code in the field 1240. The "shutdown" command causes the collector module 1110 to call the program "shutdown.exe" to run. "Shutdown.exe" checks the list 1112 and the system database 1140 (which is the SYSTEM REGISTRY in this example) to determine if the entered reason code is recognized. If the collector module 1110 recognizes the code, then it translates the code into the corresponding shutdown reason text string. The collector module 1110 then calls the remote API InitiateSystemShutdownEx and passes the text string to the second computer system 1160. The second computer system 1160 then stores the text string in the log file 1170 (which the SYSTEM LOG in this example).

It can thus be seen that a new a useful method and system for obtaining computer shutdown information has been provided. In view of the many possible embodiments to which the principles of this invention may be applied, it should be recognized that the embodiments described herein with respect to the drawing figures is meant to be illustrative only and should not be taken as limiting the scope of invention. For example, those of skill in the art will recognize that the elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

What is claimed is:

1. A computer-implemented method for obtaining information about a shutdown of a computer, the computer having an operating system managing at least one user-mode process, the shutdown of the computer including a shutdown of the operating system, the method comprising:
   presenting a user with a plurality of reasons for the shutdown of the computer;
   receiving a user selection of at least one of the plurality of reasons;
   storing the selected reason in a memory; and
   capturing a state of the at least one user-mode process for subsequent analysis.

2. A computer-readable medium having stored thereon computer-executable instructions for performing the method of claim 1.

3. The method of claim 1, further comprising:
   retrieving the plurality of reasons from a system database; and,
   presenting the retrieved reasons to the user.

4. The method of claim 3, wherein the reasons are retrieved from entries located in a system database, wherein each reason entry indicates whether the reason is to be displayed during a shutdown of the computer, or during restart of the computer following a shutdown.

5. The method of claim 1, wherein at least one of the plurality of reasons is user-configurable.

6. The method of claim 1, further comprising:
   receiving from the user a typed-in description of at least one reason for the shutdown; and,
   storing the typed-in description in the memory.

7. The method of claim 1, further comprising:
   receiving from the user a selection of whether the shutdown was planned or unplanned; and,
   storing the planned or unplanned selection in the memory.

8. The method of claim 1, wherein the user initiates the shutdown of the computer and selects one or more reasons for shutting down the computer at a remote computer that is in communication with the computer being shut down.

9. The method of claim 1, further comprising prompting the user to enter the shutdown reason in response to the user initiating a shutdown of the computer.

10. The method of claim 1, further comprising prompting the user to enter the shutdown reason in response to the user restarting the computer subsequent to the computer being shutdown.

11. The method of claim 1, wherein the reason is received via a command line interface.

12. The method of claim 11, wherein the reason is received in the form of a reason code.

13. The method of claim 1, further comprising receiving a user indication of a remote machine that is being shutdown.

14. The method of claim 1, further comprising:
   determining, based on the user specified selection, whether the shutdown is planned or unplanned; and
   if the shutdown is determined to be unplanned, performing the capturing step.

15. A computer-implemented method for obtaining information about a shutdown of a computer, the method comprising:
   receiving a user entry of a command to shut down the computer along with at least one shutdown reason code;
   searching a list of predefined shutdown reason codes to determine whether the entered shutdown reason code is recognized;
   if the entered reason code is recognized, storing the entered reason code in a memory;
   if the entered reason code indicates that the shutdown is unplanned, taking a snapshot of a current state of each of a plurality of user-mode processes, the snapshot comprising at least one parameter of each user-mode process; and
   storing the snapshot in a non-volatile memory.

16. A computer-readable medium having stored thereon computer-executable instructions for performing the method of claim 15.

17. The method of claim 15, wherein the receiving step further comprises receiving the name of the computer that is being shutdown, and wherein the storing step further comprises storing the reason code on a memory of the named computer.

18. The method of claim 15, wherein the receiving step further comprises receiving the name of the computer that is being shutdown, and wherein the storing step further comprises storing the snapshot on a memory of the named computer.

19. The method of claim 15, wherein the snapshot further comprises:
   at least one pagefile parameter; and
   at least one system parameter.

20. The method of claim 19, wherein the at least one pagefile parameter comprises a peak utilization amount of a pagefile.

21. The method of claim 19, wherein the at least one system parameter comprises an amount of an operating system kernel in a volatile memory at the time of shutdown.

22. The method of claim 15, wherein the snapshot comprises, for each user-mode process, an amount of memory utilized by the process.

23. The method of claim 15, wherein the snapshot comprises, for each user-mode process, a relative priority of the process.

24. The method of claim 15, wherein the snapshot comprises, for each user-mode process, a number of pointers to blocks of memory utilized by the process.

25. The method of claim 15, wherein the snapshot comprises, for each user-mode process, a number of threads of execution associated with the process.

26. The method of claim 15, wherein the snapshot comprises extensible markup language (XML).

27. A computer-implemented method for obtaining information about a shutdown of a computer, wherein the computer has a memory and an operating system managing a plurality of used-mode processes, the shutdown of the computer including a shutdown of the operating system, the method comprising:

receiving from a user a reason for shutting down the computer, wherein the reason is one of a plurality of predefined shutdown reasons;

taking a snapshot of a state of each of the plurality of used-mode processes that are running on the computer at the time of the shutdown; and storing the received reason and the snapshot in the memory.

28. A computer-readable medium having stored thereon computer-executable instructions for performing the method of claim 27.

29. The method of claim 27, further comprising, in response to the user initiating the shutdown of the computer, prompting the user to enter the shutdown reason.

30. The method of claim 27, further comprising, in response to the user rebooting the computer after an unexpected shutdown, prompting user to enter the reasons for the unexpected shutdown.

31. A method for obtaining a information about a shutdown of a computer having an operating system managing a plurality of user mode processes, the shutdown of the computer including a shutdown of the operating system, the method comprising:

in response to a user initiating the shutdown of the computer;

retrieving a list of preconfigured shutdown reasons from a database on the computer;

presenting the list of preconfigured shutdown reasons to the user;

prompting the user to select one or more of the preconfigured shutdown reasons;

storing the selected preconfigured shutdown reason or reasons in a log file on the computer;

if the selected preconfigured shutdown reason indicates that the shutdown is unplanned, taking a snapshot of a current state of the plurality of user mode processes on the computer;

storing the snapshot on a non-volatile memory of the computer and, shutting down the computer.

32. A computer-readable medium having stored thereon computer-executable instructions for performing the method of claim 31.

33. The method of claim 31, further comprising:

prompting the user to select whether the shutdown is planned or unplanned; and, storing the planned or unplanned selection in the log file.

* * * * *

UNITED STATES PATENT AND TRADEMARK OFFICE
CERTIFICATE OF CORRECTION

PATENT NO. : 7,028,172 B2  Page 1 of 1
APPLICATION NO. : 10/040222
DATED : April 11, 2006
INVENTOR(S) : Bjorn B. Levidow et al.

It is certified that error appears in the above-identified patent and that said Letters Patent is hereby corrected as shown below:

Col. 11,
In Claim 31, line 22, "obtaining a information" should be --obtaining information--.

Signed and Sealed this

Tenth Day of April, 2007

JON W. DUDAS
*Director of the United States Patent and Trademark Office*